United States Patent [19]
Powell

[11] Patent Number: 5,878,952
[45] Date of Patent: *Mar. 9, 1999

[54] MODULAR ROBOT AUXILIARY AXIS SYSTEM

[76] Inventor: Thomas M. Powell, 4880 Hough Rd., Dryden, Mich. 48428

[ * ] Notice: This patent issued on a continued prosecution application filed under 37 CFR 1.53(d), and is subject to the twenty year patent term provisions of 35 U.S.C. 154(a)(2).

[21] Appl. No.: 438,097

[22] Filed: May 8, 1995

[51] Int. Cl.⁶ .................................................. E01H 11/00
[52] U.S. Cl. ................................ 239/1; 239/173; 238/121
[58] Field of Search ................................. 258/121, 10 R, 258/172; 104/106; 238/139, 180; 118/321, 323; 239/750, 752, 173; 427/421

[56] References Cited

U.S. PATENT DOCUMENTS

| | | | |
|---|---|---|---|
| 1,229,900 | 6/1917 | Davenport | 238/179 |
| 3,819,114 | 6/1974 | Bush | 238/121 |
| 4,285,469 | 8/1981 | Hammelmann | 239/750 |
| 4,630,567 | 12/1986 | Bambousek et al. | 901/43 X |
| 4,821,673 | 4/1989 | Kingakubo et al. | 239/753 X |
| 4,934,278 | 6/1990 | Tanita et al. | 104/119 |
| 4,951,600 | 8/1990 | Soshi et al. | 118/696 |
| 4,977,000 | 12/1990 | Murayama et al. | 118/323 X |
| 4,989,782 | 2/1991 | McKie | 238/179 X |
| 5,085,374 | 2/1992 | Okuda et al. | 239/751 |
| 5,111,997 | 5/1992 | Ikuta et al. | 239/750 |
| 5,141,165 | 8/1992 | Sharpless et al. | 239/752 |
| 5,183,377 | 2/1993 | Becker et al. | 414/751 |
| 5,266,115 | 11/1993 | Taccon et al. | 118/663 |
| 5,348,585 | 9/1994 | Weston | 118/305 |

FOREIGN PATENT DOCUMENTS

| | | | |
|---|---|---|---|
| 387763B | 8/1988 | Austria | B66C 7/10 |
| 084523A2 | 7/1983 | European Pat. Off. | B05B 13/04 |
| 247962A2 | 12/1987 | European Pat. Off. | B23Q 1/00 |
| 537923A3 | 4/1993 | European Pat. Off. | G11B 15/68 |
| 2621022 | 3/1989 | France | B65G 41/00 |
| 637817 | 10/1936 | Germany | 238/121 |
| 4-35889 | 2/1992 | Japan | B25J 17/00 |
| 92155 | 4/1993 | Japan | 239/750 |
| 986776 | 1/1983 | U.S.S.R. | B25J 11/00 |
| 7159 | of 1904 | United Kingdom | 258/172 |
| 2180173A | 3/1987 | United Kingdom | B05B 13/06 |

OTHER PUBLICATIONS

"Model TR–5002 and TR–5003 Electric Painting Robot System Components for Use in Hazardous Locations", dated May 10, 1989 (3 pages).

"ABB Flexible Automation AS", dated Jan. 9, 1995 (5 pages).

*Primary Examiner*—Kevin Weldon
*Attorney, Agent, or Firm*—Webb Ziesenheim Bruening Logsdon Orkin & Hanson, P.C.

[57] ABSTRACT

A modular rail system for positioning a six axis robot about an auxiliary axis includes a plurality of rail sections which are selectively interconnected in order to provide a reconfigurable length about the auxiliary axis, and the six axis robot for movement with respect to the rail sections about the auxiliary axis. The rail sections may include a first end section positioned toward a first end of the auxiliary axis, a second end section positioned toward a second end of the auxiliary axis, and one or more intermediate sections positioned between the first and second end sections. The first end section, the intermediate sections and the second end section are interconnected along the auxiliary axis.

14 Claims, 9 Drawing Sheets

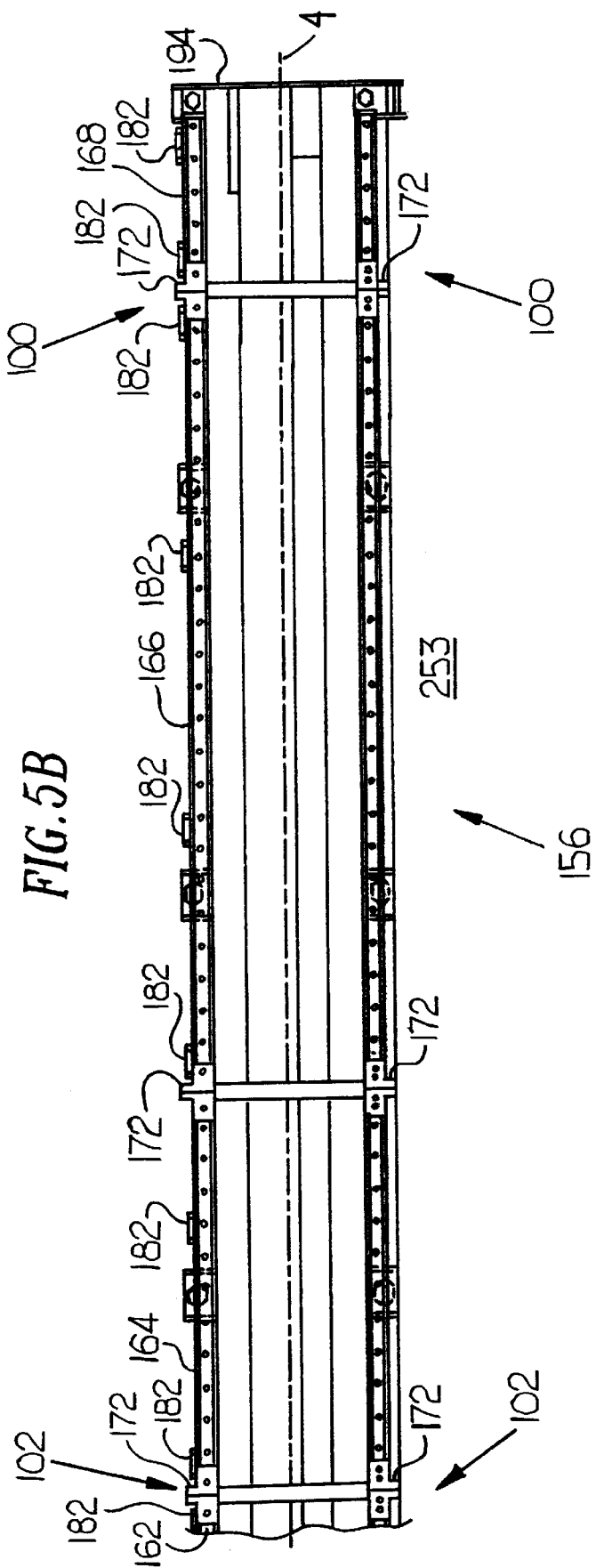

MODULAR ROBOT AUXILIARY AXIS SYSTEM

BACKGROUND OF THE INVENTION

1. Field of the Invention

This invention relates to a rail system for a robot and, more particularly, to a modular rail system which provides an auxiliary axis with a reconfigurable length for a plural axis robot.

2. Background of Information

In a manufacturing process using a robot, it is often necessary to increase the working envelope of the robot through the addition of one or more auxiliary axes. Typically, the auxiliary axis is a linear or longitudinal axis which is parallel with respect to a conveyor or workpiece associated with the robot. The length of a fixed, single piece longitudinal axis is generally limited by the available machine tools to about 12 meters.

In robotic painting applications, for example, it is known to provide an auxiliary axis for a plural axis robot in both "Clean Wall" and "In-Booth" configurations. The "Clean Wall" configuration includes a robot cantilevered from a base. A barrier or wall is positioned between the base and the robot which is located in a painting booth. In this manner, there is smooth air flow in the painting booth and minimal obstruction of the floor therein. Furthermore, the base is normally kept clean of paint overspray and is accessible from outside of the painting booth for service. The "In-Booth" configuration is a floor mounted unit with the robot mounted above the base. This configuration is typically used in retrofitting existing painting booths or when floor space is restricted.

U.S. Pat. No. 5,183,377 discloses a mounting and rail structure for an industrial robot including vertical support posts for longitudinal rail carriers which are interconnected at the end by transverse connectors. Four end elements each connect a rail carrier with a corresponding transverse connecting bar. A transverse movable rail has its two ends positioned in pocketlike uprights of two respective end elements. An object of U.S. Pat. No. 5,183,377 is to provide a rail system in such a manner that many parts are standardized in order that a variety of combinations and rail systems can be assembled from the many standardized parts.

In robotic painting applications, for example, relatively long auxiliary axes (e.g., greater than about 7.5 meters in length) are difficult to handle during both shipping and installation. In prior known rail systems, a relatively large number of different length components are required in order to provide a sufficient variety of auxiliary axis lengths which meet the needs of most applications.

There is a need, therefore, for a rail system for a robot which is easy to handle during shipment from the vendor to the user of the system.

There is also a need for a rail system for a robot which is easy to handle during installation of the system.

There is another need for a rail system for a robot which is easily reconfigured during modification of the system.

There is still another need for a rail system for a robot which reduces the inventory requirements of the vendor of the system.

SUMMARY OF THE INVENTION

These and other needs are met by the present invention which is directed toward a modular rail system for positioning a robot mechanism about a first axis. The modular rail system includes a plurality of rail sections which are selectively interconnected in order to provide a reconfigurable length about the first axis; and a robot mechanism having at least one second axis for movement with respect to the rail sections about the first axis.

Alternatively, a modular rail system for positioning a robot along a longitudinal axis includes a first end section positioned toward a first end of the longitudinal axis; a second end section positioned toward a second end of the longitudinal axis; and at least one intermediate section positioned between the first and second end sections, with the first end section, the intermediate section and the second end section being interconnected along the longitudinal axis.

Alternatively, a modular rail system includes a plurality of rail sections which are selectively interconnected in order to provide a reconfigurable length about a first axis; and a robot mechanism for movement with respect to the rail sections about the first axis including a spray nozzle mechanism for spraying a substance with respect to at least one second axis.

It is an object of this invention to provide a robot auxiliary axis system which provides a variety of configurations of the length of the auxiliary axis.

It is also an object of this invention to provide a robot auxiliary axis system which provides a variety of configurations including one or more robots for use in Clean Wall or In-Booth configurations.

It is a further object of this invention to provide a robot auxiliary axis system which is easily manufactured at a relatively low cost.

It is also an object of this invention to provide a robot auxiliary axis system which is relatively easily stored, handled, shipped or installed in comparison to known prior art systems.

BRIEF DESCRIPTION OF THE DRAWINGS

A full understanding of the invention can be gained from the following description of the preferred embodiment when read in conjunction with the accompanying drawings in which:

FIGS. 5A–5B, when placed side by side, are a plan view of an auxiliary axis rail system including a left end section, plural intermediate sections, and a right end section in accordance with the invention;

DESCRIPTION OF THE PREFERRED EMBODIMENT

As employed herein, the term "robot" shall expressly include, but not be limited to any automatic, programmable or remote controlled device for any industrial, manufacturing or automation application, such as, for example, painting, with such device having one or more axes of freedom for positioning a manipulator or working device, such as, for example, a painting nozzle.

As employed herein, the term "forward" refers to the operational side of the auxiliary axis where a conveyor or workpiece associated with a robot is located. Conversely, the term "rearward" refers to the opposite side of the auxiliary axis with respect to the forward side.

Figure 1:
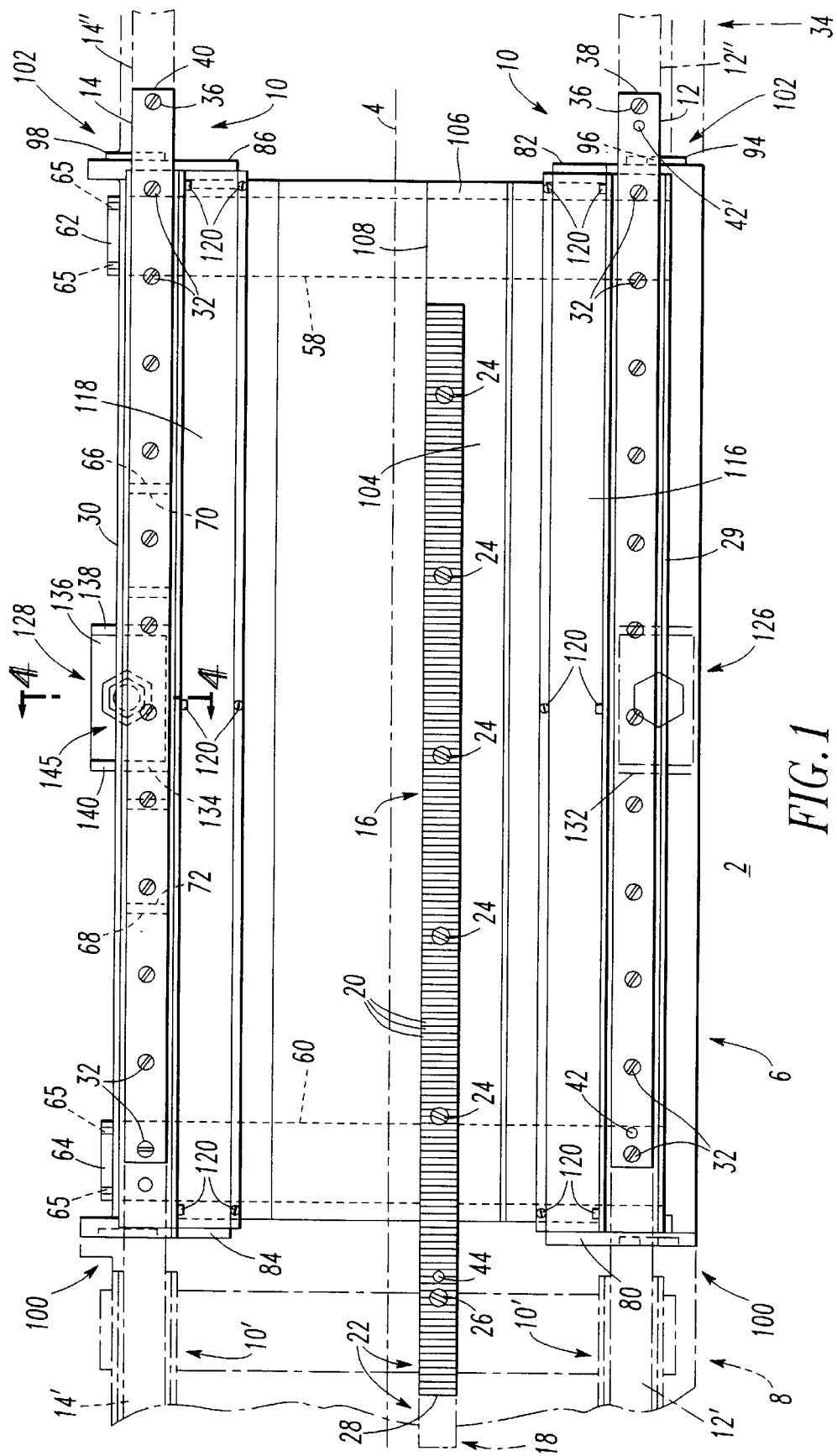
FIG. 1 is a plan view of a modular rail section in accordance with the invention.
Figure 2:
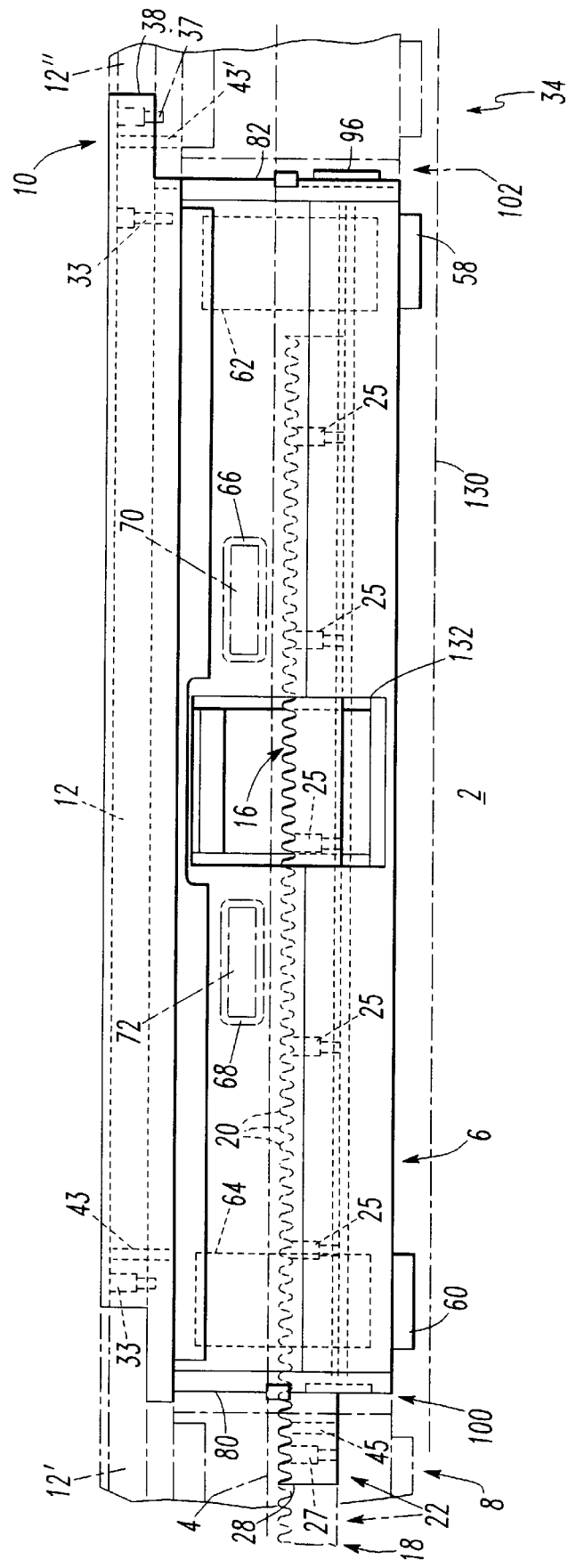
FIG. 2 is a side view of the modular rail section of FIG. 1.

Referring to FIGS. 1 and 2, a portion of a modular rail system 2 is illustrated. The modular rail system 2, which is positioned along a longitudinal or auxiliary axis 4, includes a plurality of rail sections 6 and 8 (shown in phantom line drawing) longitudinally positioned along the axis 4. The rail sections 6 and 8 include bearing way mechanisms 10 and 10' having two longitudinal bearing ways 12,14 and 12',14', respectively, along the axis 4. The exemplary bearing ways 12,14 are model #HSR55+1500L "G" Series rails marketed by THK and are made of either hardened steel, hardened steel with an electroless nickel coating, or stainless steel, although the invention is applicable to other types of ways, rails, materials and coatings suitable for slidable or other low-friction engagement. The rail sections 6 and 8 also include respective longitudinal racks 16 and 18 (shown in phantom line drawing) having a plurality of teeth 20. The racks 16,18 form a longitudinal rack mechanism 22 along the axis 4.

The rack 16 is initially cantilevered from the rail section 6 and is secured thereto by a plurality of fasteners 24 such as screws through corresponding holes 25 (shown in hidden line drawing in FIG. 2) of the rack 16. The rack 16 overlaps both of the rail sections 6 and 8. After the rail sections 6,8 are secured together, as described below with the fasteners 172 of FIGS. 5A and 5B, the rack 16 is also secured to the adjacent rail section 8 by a fastener 26, similar to the fasteners 24, through a corresponding hole 27 (shown in hidden line drawing in FIG. 2) of the rack 16. In this manner, suitable alignment of the interface 28 between the racks 16,18 of the rack mechanism 22 is maintained.

The longitudinal bearing ways 12 and 14, which are initially cantilevered from the rail section 6, are secured adjacent a forward side 29 (i.e., at the bottom of FIG. 1) and a rearward side 30 (i.e., at the top of FIG. 1), respectively, of such rail section 6 by a plurality of fasteners 32 such as screws through corresponding holes 33 (two of which are shown in hidden line drawing in FIG. 2 with the bearing way 12). The longitudinal bearing ways 12 and 14 overlap the rail section 6 and an adjacent rail section 34 (shown in phantom line drawing). After the rail sections 6 and 34 are secured together, each of the bearing ways 12 and 14 is also secured to the adjacent rail section 34 by a fastener 36, similar to the fasteners 32, through a corresponding hole 37 (as shown in hidden line drawing in FIG. 2 with the bearing way 12). In this manner, as discussed in greater detail below, the initial alignment of the interfaces 38,40 between the adjacent pairs of bearing ways 12–12",14–14", respectively, is provided.

The forward bearing way 12 is further aligned by a dowel 42 through a corresponding hole 43 (shown in hidden line drawing in FIG. 2 near the left end) of the bearing way 12. During the assembly of the rail sections 6 and 34 (shown in phantom line drawing), the bearing way 12 is also aligned to the adjacent rail section 34 by a dowel 42', similar to the dowel 42, through a corresponding hole 43' (shown in hidden drawing in FIG. 2 near the right end) of the bearing way 12. In this manner, the position of the forward bearing way 12 is preferably fixed with respect to the forward side 29 of the rail section 6, although the dowels 42,42' are not required. In a similar manner, the rack 16 is aligned with the adjacent rack 18 (shown in phantom line drawing) by a dowel 44 through a corresponding hole 45 (shown in hidden line drawing in FIG. 2 near the left end) of the rack 16, although the dowel 44 is not required.

Figure 3:
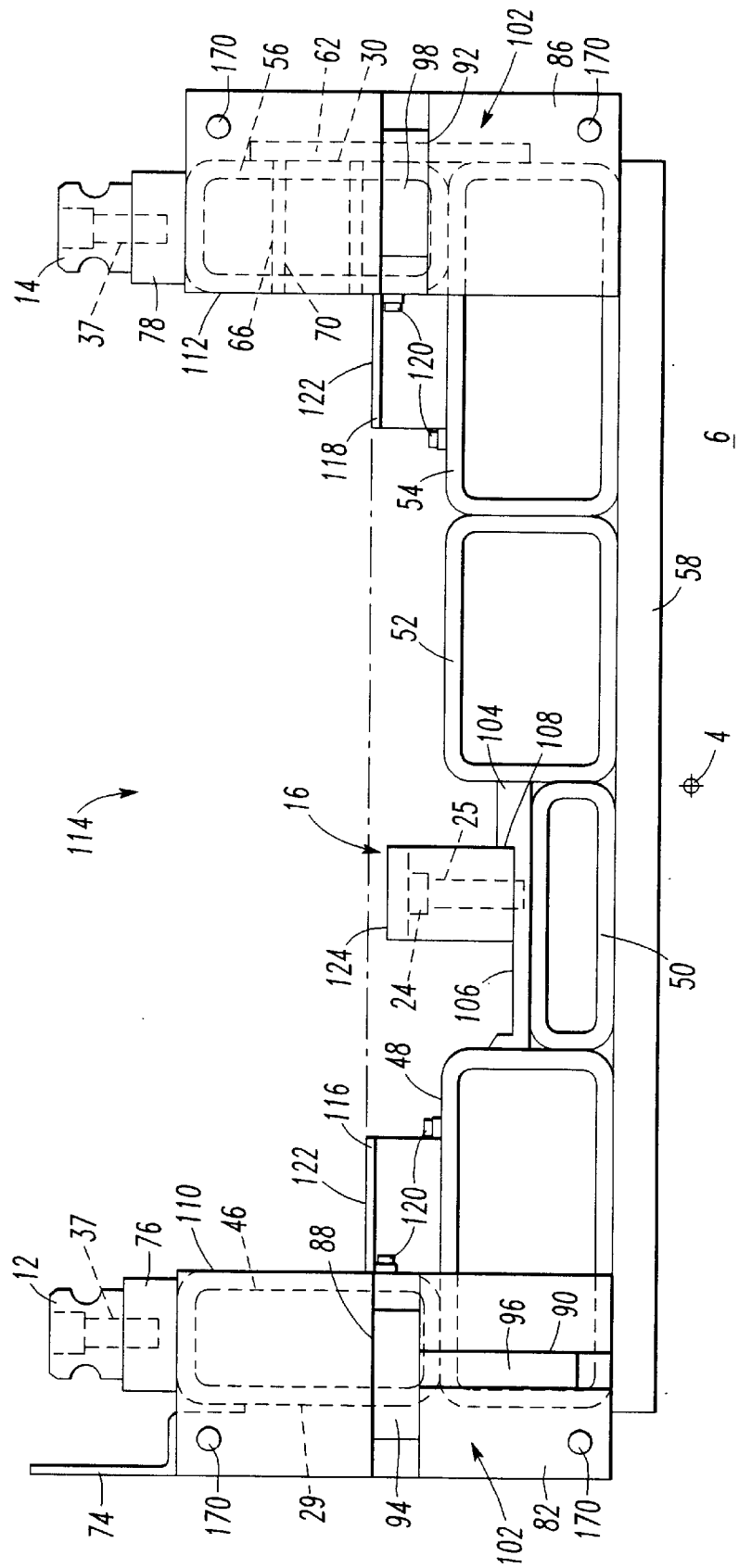
FIG. 3 is an end view of the modular rail section of FIG. 1.

Also referring to FIG. 3, the rail section 6 includes a plurality of generally rectangular tubes 46,48,50,52,54,56 along the axis 4 of FIG. 1. Each of the longitudinal tubes 48–54 is welded to the adjacent tubes 46–56 (e.g., the tube 48 is welded to the adjacent tubes 46,50; the tube 50 is welded to the adjacent tubes 48,52; etc). The tubes 46,56 (shown in hidden line drawing in FIG. 3) are welded to the tubes 48,54 at a right angle thereto and form the sides 29,30, respectively, of the rail section 6. Welded to the bottom of the tubes 48,50,52,54 near the right and left sides of the rail section 6 of FIG. 2, are two transverse members 58 and 60, respectively.

As best shown in FIG. 1, the rail section 6 also includes two rectangular mounting members 62,64 having a plurality of mounting holes 65. The members 62,64 are welded to the tubes 54,56 at the rearward side 30 of the rail section 6. A pair of generally rectangular cable routing tubes 66,68 are welded within two transverse holes 70,72, respectively, in the longitudinal tube 56 at the rearward side 30 of the rail section 6.

As best shown in FIG. 3, the forward side 29 of the rail section 6 includes a longitudinal guard member 74 which is bolted to the tube 46 by bolts (not shown). Welded to the top portion of the tubes 46,56 are two mounting members 76,78 for the bearing ways 12,14, respectively. The bearing ways 12,14 are secured to the respective mounting members 76,78 by the fasteners 32 of FIG. 1.

Still referring to FIG. 1, welded to the opposite ends of the tubes 46,48 of FIG. 3 are rectangular members 80,82. Similarly welded to the opposite ends of the tubes 56,54 of FIG. 3 are rectangular members 84,86. As shown in FIG. 3, the member 82 has a horizontal slot 88 and a vertical slot 90. The member 86 has a horizontal slot 92. The members 80,84 are similar to the members 82,86, respectively. As shown in FIGS. 1 and 3, three tabs 94,96,98, such as a Model #E430 fixture key marketed by E&E, are partially inserted into the slots 88,90,92, respectively, and are welded thereto on the right side of the rail section 6.

In this manner, the left side of the rail section 6 has a first key mechanism 100 formed by the slots 88,90,92 of the members 80,84, and the right side of the rail section 6 has a second key mechanism 102 formed by the tabs 94,96,98 of the members 82,86. The tabs 94,96 are associated with the forward side 29 and the tab 98 is associated with the rearward side 30 of the rail section 6. The tabs 94,98 are disposed in a common horizontal plane. The tab 96 is disposed in a vertical plane. The tabs 94,96,98 facilitate the proper orientation of the rail section 6 with, for example, the adjacent rail section 34.

As best shown in FIG. 3, welded to the top side of the tube 50 is a longitudinal member 104. The longitudinal rack 16 is secured to the member 104 by the fasteners 24, as discussed above with FIGS. 1–2. The member 104 has a recess 106 with an edge 108 against which the rack 16 is aligned.

Continuing to refer to FIG. 3, the tubes 46,56 (shown in hidden line drawing) form forward (left) and rearward (right) walls 110,112, respectively. The walls 110,112 form a longitudinal channel 114 along the axis 4 between the bearing ways 12,14. A pair of right-angle members 116,118 are disposed on the forward and rearward sides of the channel 114 and are fastened to the tubes 46,48 and 56,54, respectively, by a plurality of fasteners 120. The top surface 122 of the members 116,118 is above the top surface 124 of the rack 16.

Figure 4:
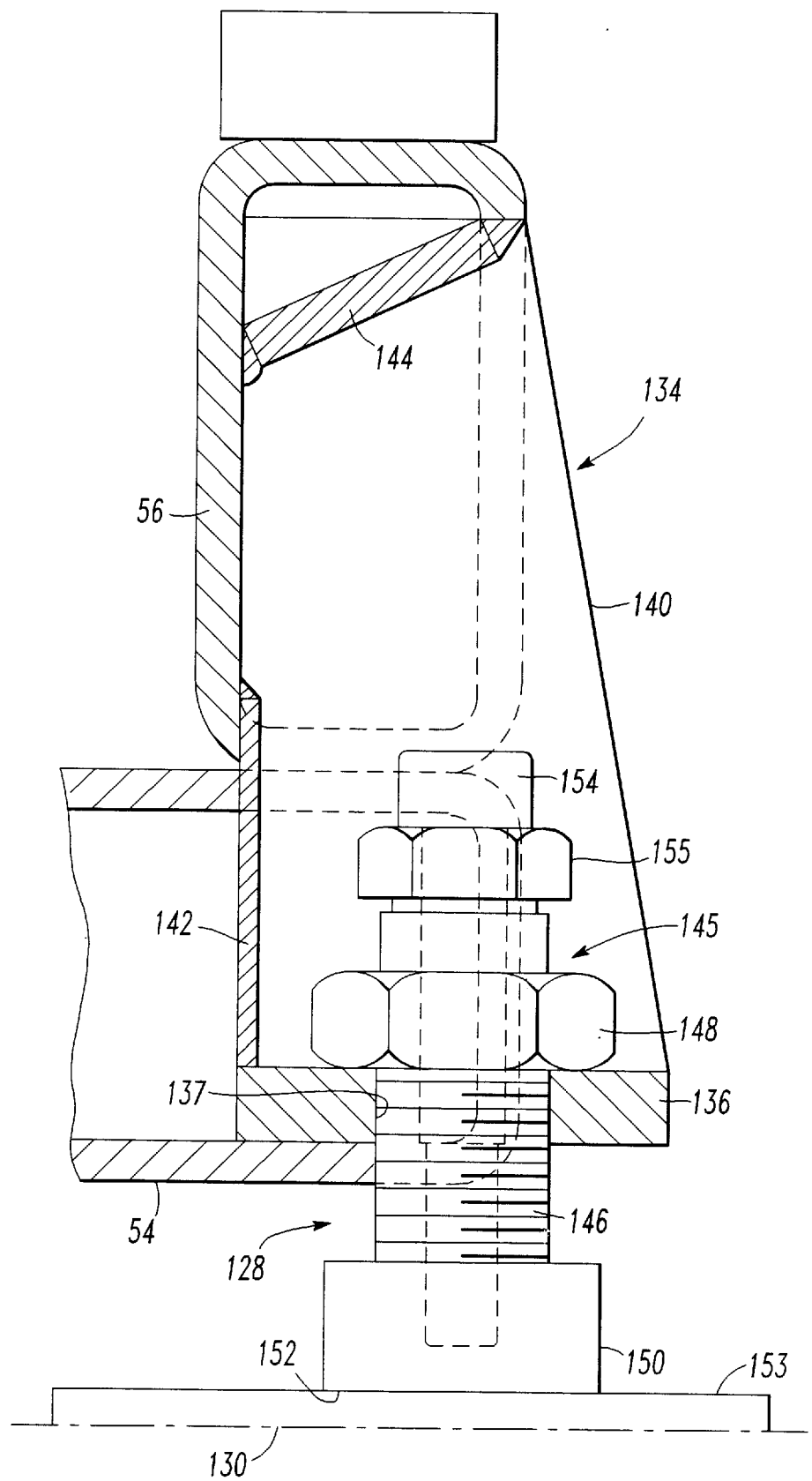
FIG. 4 is a fragmentary sectional view along lines 4—4 of FIG. 1.

Referring to FIGS. 1, 2 and 4, the rail section 6 includes a pair of leveling mechanisms 126 (shown in phantom line drawing in FIG. 1) and 128 associated with the forward side 29 and rearward side 30, respectively, of such section 6. Operation of the leveling mechanisms 126,128 raises or lowers the sides 29,30, respectively, of the rail section 6. In this manner, the elevation of the forward and rearward sides 29,30 of the rail sections 8,6,34 may be adjusted in order that the entire modular rail system 2 is in a suitable longitudinal and transverse alignment with respect to a surface 130, such as a floor, which is parallel to the axis 4.

The sides 29,30 of the rail section 6 have holes 132,134 (shown respectively in phantom and hidden line drawing in FIG. 1) wherein the leveling mechanisms 126,128, respectively, are mounted. As shown in FIG. 4, a base plate 136 having a threaded hole 137 is welded to the tube 54 at the bottom of the hole 134. Two side plates 138 (shown in FIG. 1) and 140 are welded to the sides of the hole 134, a back plate 142 is welded to the base plate 136 and the tubes 54,56, and an upper plate 144 is welded to the tube 56 at the top of the hole 134, thus forming a recess 145 for mounting the leveling mechanism 128. The leveling mechanism 126 is mounted on the forward side 29 of the rail section 6 in a similar manner.

Continuing to refer to FIG. 4, the exemplary leveling mechanism 128 includes a leveling jack 146, which is threaded in the hole 137 and secured to the base plate 136 by a hex nut 148, and a jack mounting block 150. The lower surface 152 of the block 150 is secured, for example, by welding to a support structure 153 located on the surface 130 (shown in phantom line drawing). The leveling jack 146 includes a clamping screw 154, such as a hex socket head screw, for clamping the leveling jack 146 into the block 150, and a hex nut 155 for adjusting the elevation of the leveling jack 146 with respect to the block 150. Rotation of the leveling jack hex head 155 of the leveling mechanism 128 thereby adjusts the vertical alignment of the rearward side 30 of the rail section 6 with respect to the surface 130.

Figure 5A:
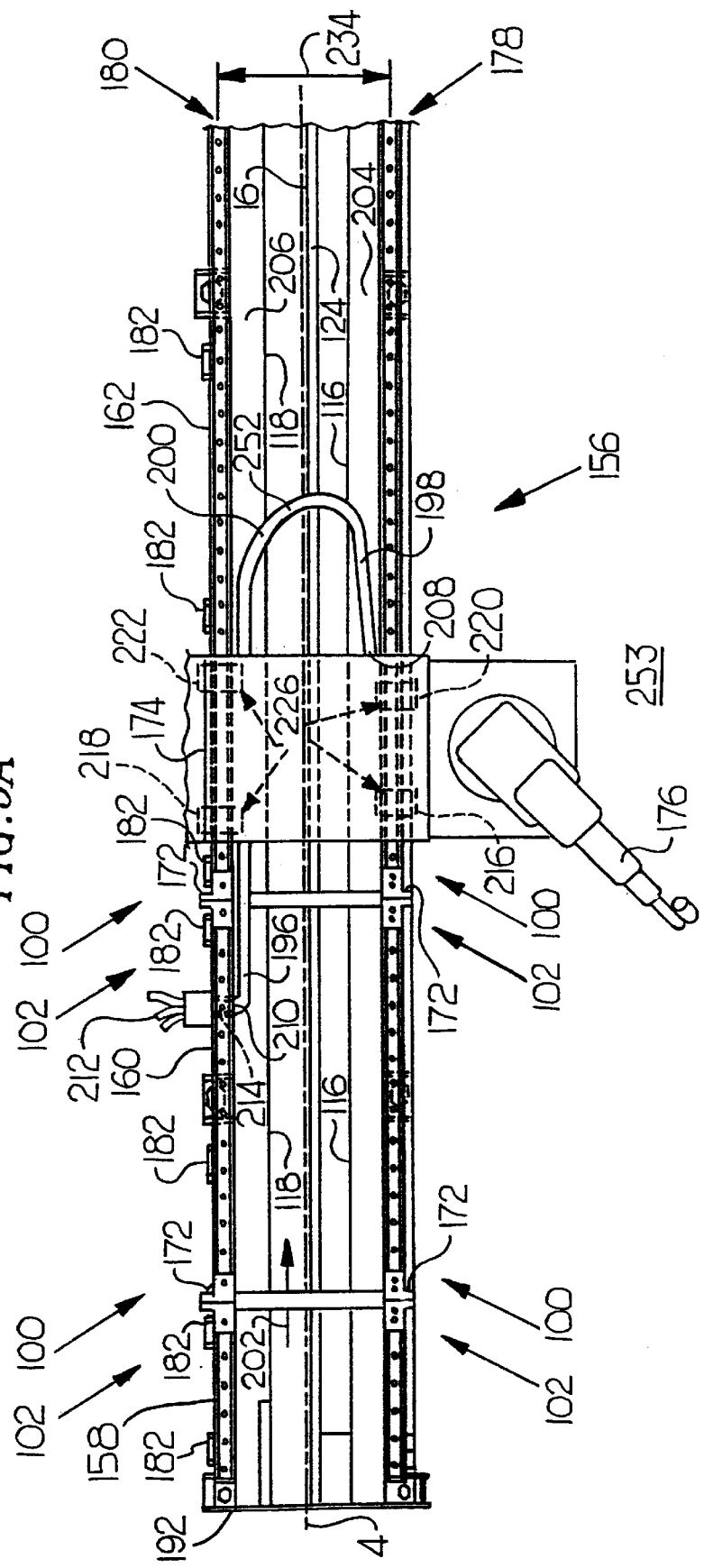

Referring now to FIGS. 5A–5B, a configuration 156 of the auxiliary axis rail system is illustrated. The auxiliary axis rail system configuration 156 includes first end section 158 positioned toward the left end of the auxiliary axis 4, four intermediate sections 160,162,164,166, and a right or second end section 168 positioned toward the right end of the axis 4. The exemplary sections 160,164 are similar to the rail section 6 of FIG. 1 and have about a 1.5M length along the axis 4. The exemplary sections 162,166 are similar to the sections 160,164 and have about a 3.0M length along the axis 4. The exemplary end sections 158,168 are also similar to the sections 160,164 and have about a 0.75M length along the axis 4. The intermediate sections 160–166 are longitudinally positioned between the end sections 158,168. As described in greater detail below, the sections 158–168 are interconnected along the axis 4. Except as discussed below, the left end section 158 is similar to the right half of the rail section 6 of FIG. 1, and the right end section 168 is similar to the left half of such rail section 6.

As shown with the rectangular members 82,86 of FIG. 3, each of the members 80,82,84,86 has a pair of holes 170 therein. After the intermediate sections 160,162, for example, are aligned, such sections 160,162 are secured together by four fasteners 172, such as screws or bolts. In this manner, four of the fasteners 172 are used to secure each of the adjacent sections 158–160, 160–162, 162–164, 164–166 and 166–168.

As discussed above with the rail section 6 of FIGS. 1–3, the sections 158–168 are keyed in order to provide proper orientation thereof in the rail system 156. For example, the left side of the sections 160,162 have the first key mechanism 100 and the right side of the rail sections 160,162 have the second key mechanism 102. The first key mechanism 100 of the rail section 162 engages the second key mechanism 102 of the adjacent rail section 160. In this manner, each of the tabs 94,96,98 (shown in FIG. 3) of the rail section 160 is inserted in a corresponding one of the slots 88,90,92 (shown in FIG. 3) of the adjacent rail section 162. The left end section 158 has the second key mechanism 102 and the right end section 168 has the first key mechanism 100.

Although the exemplary intermediate sections 160–166 have either about a 1.5M or 3.0M length, the invention is applicable to a wide range of lengths of the sections 158–168. The length and number of the intermediate sections 160–166 may easily be changed by adding, replacing or removing one or more of the sections 160–166. In this manner, as illustrated in Table I below, a modular rail track having a reconfigurable length between the ends of the axis 4 may be provided, although other configurations of the sections 158–168 are possible. As shown in Table I, the approximate total reconfigurable length is about an integer multiple of the exemplary 1.5M length of the intermediate sections 160,164. The exemplary 1.5M length is twice the length of the end sections 158,168 and one half the length of intermediate sections 162,166.

TABLE I

| Number of the Sections 158 | Number of the Sections 160,164 | Number of the Sections 162,166 | Number of the Sections 168 | Approximate Total Reconfigurable Length |
|---|---|---|---|---|
| 1 | 1 | 0 | 1 | 3.0 M |
| 1 | 0 | 1 | 1 | 4.5 M |
| 1 | 3 | 0 | 1 | 6.0 M |
| 1 | 2 | 1 | 1 | 7.5 M |
| 1 | 1 | 2 | 1 | 9.0 M |
| 1 | 0 | 3 | 1 | 10.5 M |
| 1 | 3 | 2 | 1 | 12.0 M |
| 1 | 2 | 3 | 1 | 13.5 M |
| 1 | 1 | 4 | 1 | 15.0 M |
| 1 | 0 | 5 | 1 | 16.5 M |
| 1 | 3 | 4 | 1 | 18.0 M |
| 1 | 2 | 5 | 1 | 19.5 M |
| 1 | 1 | 6 | 1 | 21.0 M |

Continuing to refer to FIGS. 5A–5B, a carriage 174 is interconnected with a robot 176. The carriage 174 is movably positioned on two longitudinal bearing ways 178,180 formed by the longitudinal bearing ways 12,14 of FIG. 1 for each of the sections 158–168. As discussed below with FIG. 6, the carriage 174 includes bearings 216,218,220,222 (shown in hidden line drawing) for movement on the bearing ways 178,180 along the auxiliary axis 4.

As discussed above with the mounting members 62,64 of FIGS. 1 and 2, each of the sections 158–168 includes two or more mounting members such as the members 182. As discussed below with FIG. 7, the members 182 accept fasteners 184 for mounting an attachment, such as an exemplary cover 186 for the rail system 156 having a vertical surface 188 and a horizontal surface 190.

Welded to the left side of the left end section 158 and to the right side of the right end section 168 are rectangular end stops 192 and 194, respectively. The carriage 174 includes two limit switches (not shown) which stop the travel of the carriage 174 (and the robot 176) in the left and right directions of FIGS. 5A and 5B. The two limit switches of the carriage 174 detect the end stops 192,194 in order to stop the travel of the carriage 174 adjacent the stops 192,194 when moving toward the left and right in FIGS. 5A and 5B, respectively. In this manner, the carriage 174 moves between the end stops 192,194 of the rail system 156. Although only one carriage 174 is positioned on the system configuration 156 for movement along the axis 4, other combinations are possible (e.g., two, three or more carriages 174 and corresponding robots 176).

The robot 176 is operatively associated with a U-shaped cable carrier 196 having legs 198,200. The cable carrier 196 is routed in a channel 202 along the axis 4 between the bearing ways 178,180. The cable carrier 196 preferably has a modular length in order to accommodate the reconfigurable length of the system configuration 156 as well as the overall travel length of the associated robot 176. The legs 198,200 of the cable carrier 196 rest and slide upon surfaces 204,206 formed by the cable support members 116,118 (shown in FIGS. 1 and 3) of each of the sections 158–168, respectively.

One end 208 of the cable carrier 196 terminates in a bracket (not shown) which is interconnected with and, hence, is pulled or pushed by the carriage 174. Emerging from the other end 210 of the cable carrier 196 is a plurality of cables 212 which are routed within the cable carrier 196. One or more of the cables 212 are routed through an exemplary transverse hole 214 (shown in hidden line drawing) of the section 160. The cable carrier 196 carries the cables 212 and air lines (not shown) associated with the carriage 174 and/or the robot 176. As discussed below with FIGS. 7 and 8, the carriage 174 supports the robot 176.

Figure 6:
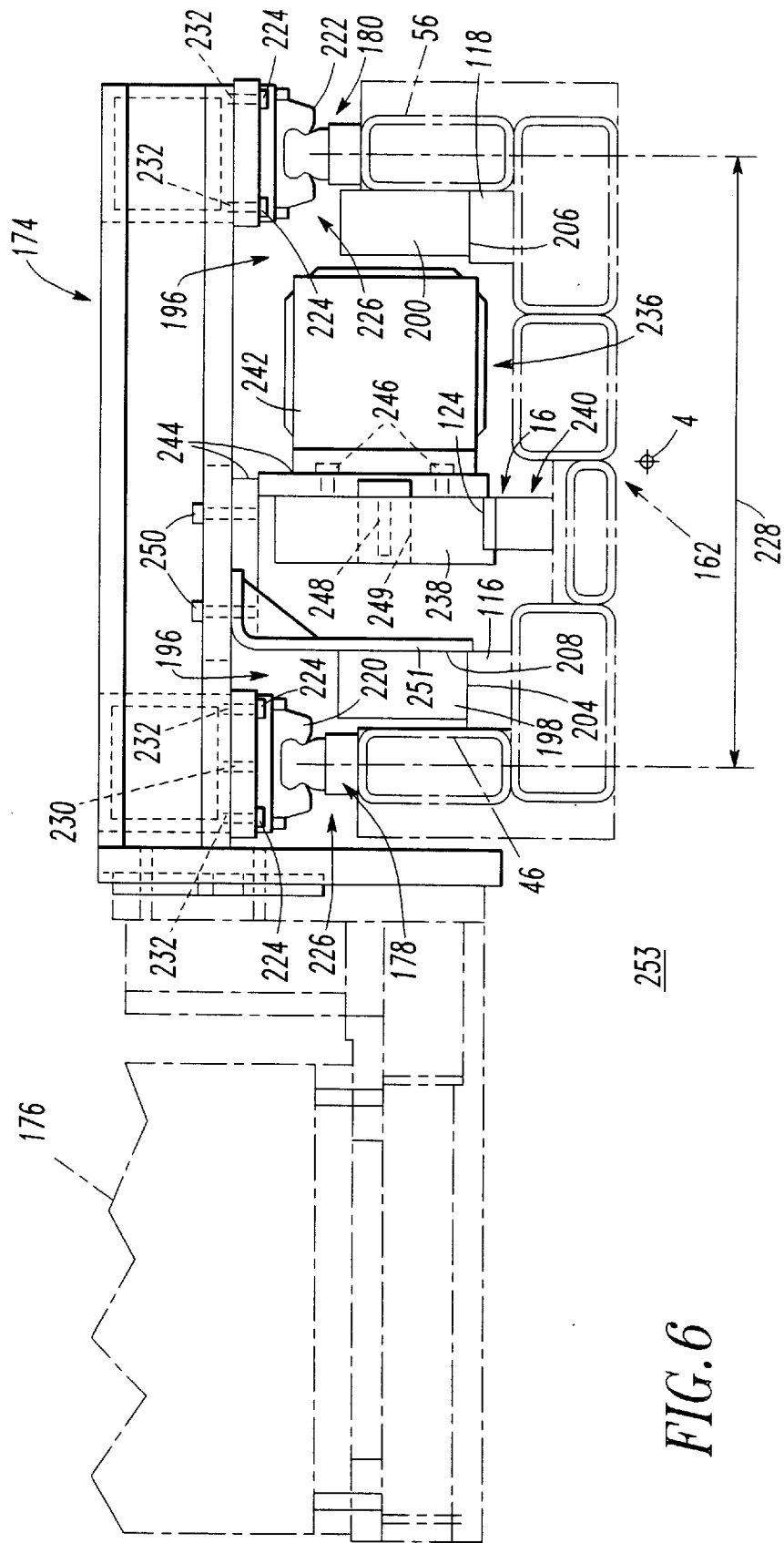
FIG. 6 is an end view of a carriage engaging a modular rail section in accordance with the invention.

Also referring to FIG. 6, the carriage 174 and the rail section 162 (shown in phantom line drawing) are illustrated. Attached at about the four corners and to the bottom of the carriage 174 are four bearing blocks 216,218 (shown in hidden line drawing in FIG. 5A) and 220,222. The exemplary bearing blocks 216–222 are model #HSR55CBSS "G" Series blocks marketed by THK, although other types of bearings or low-friction engagement devices may be utilized. Each of the blocks 216–222 is attached to the carriage 174 by a plurality of fasteners 224 such as screws. The blocks 216–222 form a bearing mechanism 226 for moving the carriage 174 and, thus, the robot 176 along the axis 4 of FIG. 5A. The blocks 216,220 and 218,222 slidably engage the longitudinal bearing ways 178 and 180, respectively. Preferably, the pair of blocks 216–220,218–222 are tolerant of any gaps at the interfaces 38,40 between the individual bearing ways 12–12", 14–14" (shown in FIG. 1) of the longitudinal bearing ways 178,180, respectively.

The blocks 216,218 and 220,222 have a generally fixed width 228 therebetween. The position of each of the blocks 216–222 with respect to the carriage 174 is preferably fixed by a dowel 230 (as shown in hidden line drawing with the block 220), although the dowels 230 are not required. The blocks 216–222 are secured to the carriage 174 by the fasteners 224 through the mounting holes 232 (as shown with the blocks 220,222).

In the same manner as the bearing way 12 of FIGS. 1 and 3, the longitudinal bearing way 178 is preferably fixed with respect to each of the sections 158–168 of FIGS. 5A–5B.

The position of the longitudinal bearing way 180 with respect to the sections 158–168 is generally fixed by the fasteners 32,36 of FIG. 1. The diameter of the holes 33,37 of the rail sections 14,14',14" of FIGS. 1–3, which is larger than the diameter of the shafts of the corresponding fasteners 32,36, provides suitable forward (left) and rearward (right) adjustment of the width 234 (shown in FIG. 5A) between the bearing ways 178,180. In this manner, the bearing way 180 is suitably mobile with respect to the bearing way 178 in order to adjust the generally fixed width 234 therebetween with a measuring device, such as a gage, and sufficiently match the width 228 between the blocks 216,218 and 220,222.

Continuing to refer to FIG. 6, operatively associated with the robot 176 (shown in phantom line drawing) and interconnected with the carriage 174 is a drive mechanism 236. The drive mechanism 236 includes a pinion gear 238 which engages a rack 240 formed by the racks 16,18 of FIG. 1. Rotation of the pinion gear 238 engages the teeth 20 (shown in FIG. 1) of the rack 240 which moves the carriage 174 and, thus, the robot 176 about the axis 4. The drive mechanism 236 also includes a motor-gear box 242 secured to a mount 244 by a plurality of fasteners 246 such as screws. The shaft 248 (shown in hidden line drawing) of the motor-gear box 242 is interconnected with a lock bushing 249 (shown in hidden line drawing) which engages the pinion gear 238 and, thus, drives the carriage 174 along the axis 4. The exemplary motor-gear box 242 includes a model #USASGM-30-YR21 3.0 Kw servo motor marketed by Yaskawa. Preferably, for painting or other hazardous applications, the cable carrier 196 is solvent resistant and the motor-gear box 242 is explosion-proof, although other types of cables and mechanisms for driving the pinion gear 238 may be utilized. The mount 244 is secured to the carriage 174 by a plurality of fasteners 250 such as screws.

An L-shaped bracket 251 is welded to the bottom of the carriage 174. The bracket 251 is interconnected with the end 208 of the cable carrier 196. Accordingly, movement of the carriage 174 moves the bracket 251 and the end 208 of the leg 198 therewith. The leg 198 rests and slides upon the surface 204 of the member 116. Preferably, there is a slight clearance between the tube 46 and the leg 198. The bracket 251 separates the leg 198 from the pinion gear 238. The leg 200 rests upon the surface 206 of the member 118 between the tube 56 and a bracket (not shown) of the motor-gear box 242. The cables 212 (shown in FIG. 5A) of the cable carrier 196 at the end 208 thereof terminate in the cable bracket (not shown) and interconnect with the motor-gear box 242 in order to provide, for example, power, control signals, and position feedback signals. Also referring to FIG. 5A, the surfaces 204,206 of the respective members 116,118 support the U-bend 252 (not shown in FIG. 6) of the cable carrier 196 above the top surface 124 of the rack 16.

Referring to FIGS. 5A–5B and 6, a modular auxiliary axis/robot system 253 includes the rail sections 158–168, the cable carrier 196, the carriage 174 with the drive mechanism 236 for movement with respect to the axis 4, and the robot 176 which is operatively associated with the carriage 174 and the cable carrier 196. As explained above, the modular sections 158–168 are reconfigurable in a variety of configurations in order to extend the work envelope of one or more robots 176 along the auxiliary axis 4.

Figure 7:
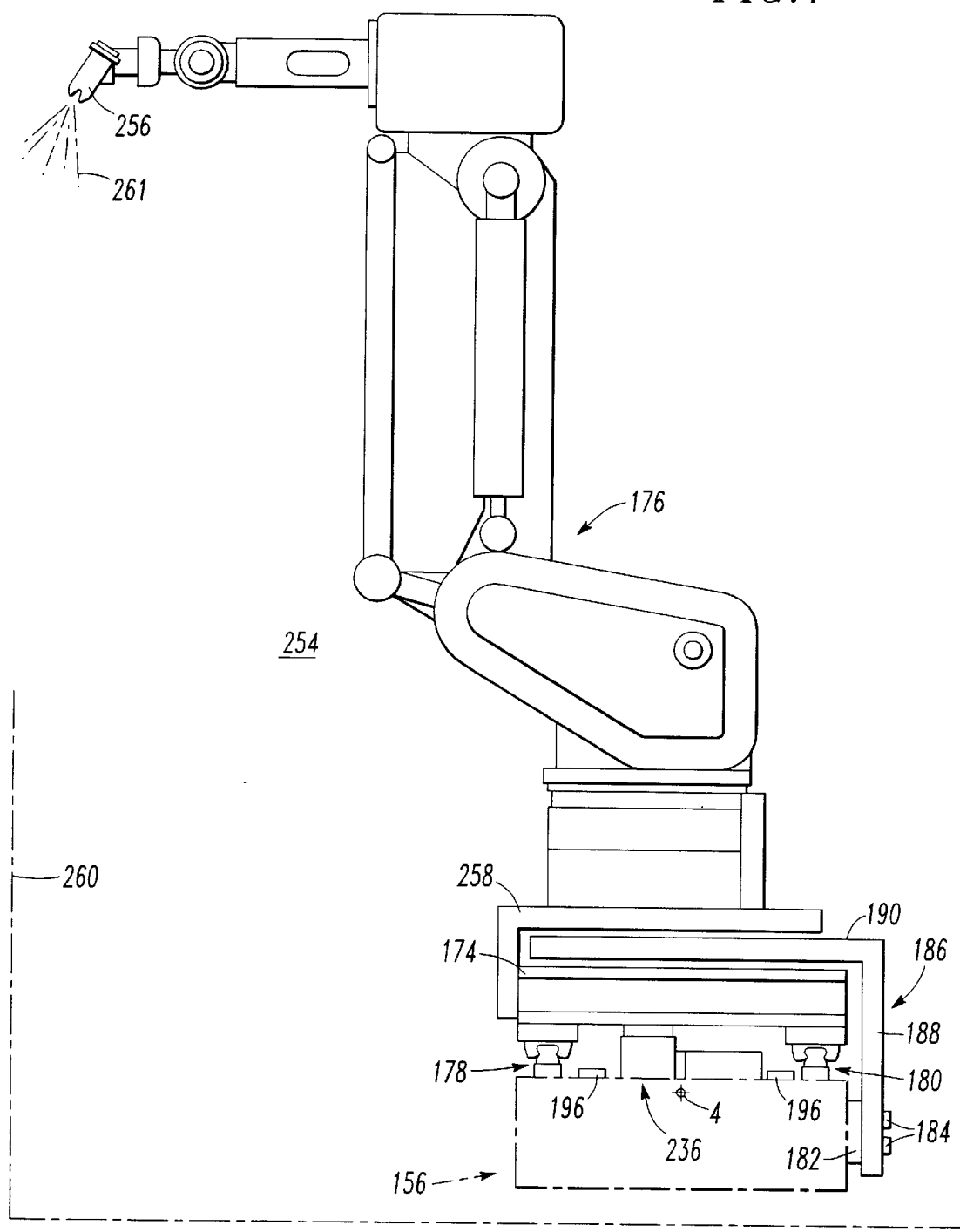
FIG. 7 is an elevation view of an In-Booth robot and rail system in accordance with an embodiment of the invention.

Referring to FIG. 7, an In-Booth robot and rail system 254 is illustrated. The exemplary system 254 includes the reconfigurable rail system 156 (shown in phantom line drawing) having the bearing ways 178,180, and the robot 176 having a painting nozzle 256, although the system 254 is applicable to a wide variety of robotic applications. The exemplary model Motoman/AEG P-8 paint robot 176 is marketed by AEG. The robot and the spray nozzle 256 have six axes for movement with respect to the auxiliary axis 4, although the invention is applicable to other types of robots having any number of axes. The robot 176 is operatively associated with the carriage 174 and a support mechanism 258 cooperating with the carriage 174 for supporting the robot 176 within a painting booth 260 (shown in phantom line drawing) in order to provide an in-booth configuration of the systems 156,254.

As discussed above with FIG. 5A, the members 182 of the rail system 156 facilitate mounting of the cover 186. The horizontal surface 190 of the cover 186, which is located between the support mechanism 258 and the carriage 174, covers the carriage 174, the drive mechanism 236 and the rail system 156 in order to protect these from, for example, paint from the painting nozzle 256. Although the exemplary system 254 and nozzle 256 are used for spraying paint 261, the invention is applicable to other spraying applications such as coating, sealing or cleaning applications which spray a variety of substances such as liquids, aerosols and powders.

Figure 8:
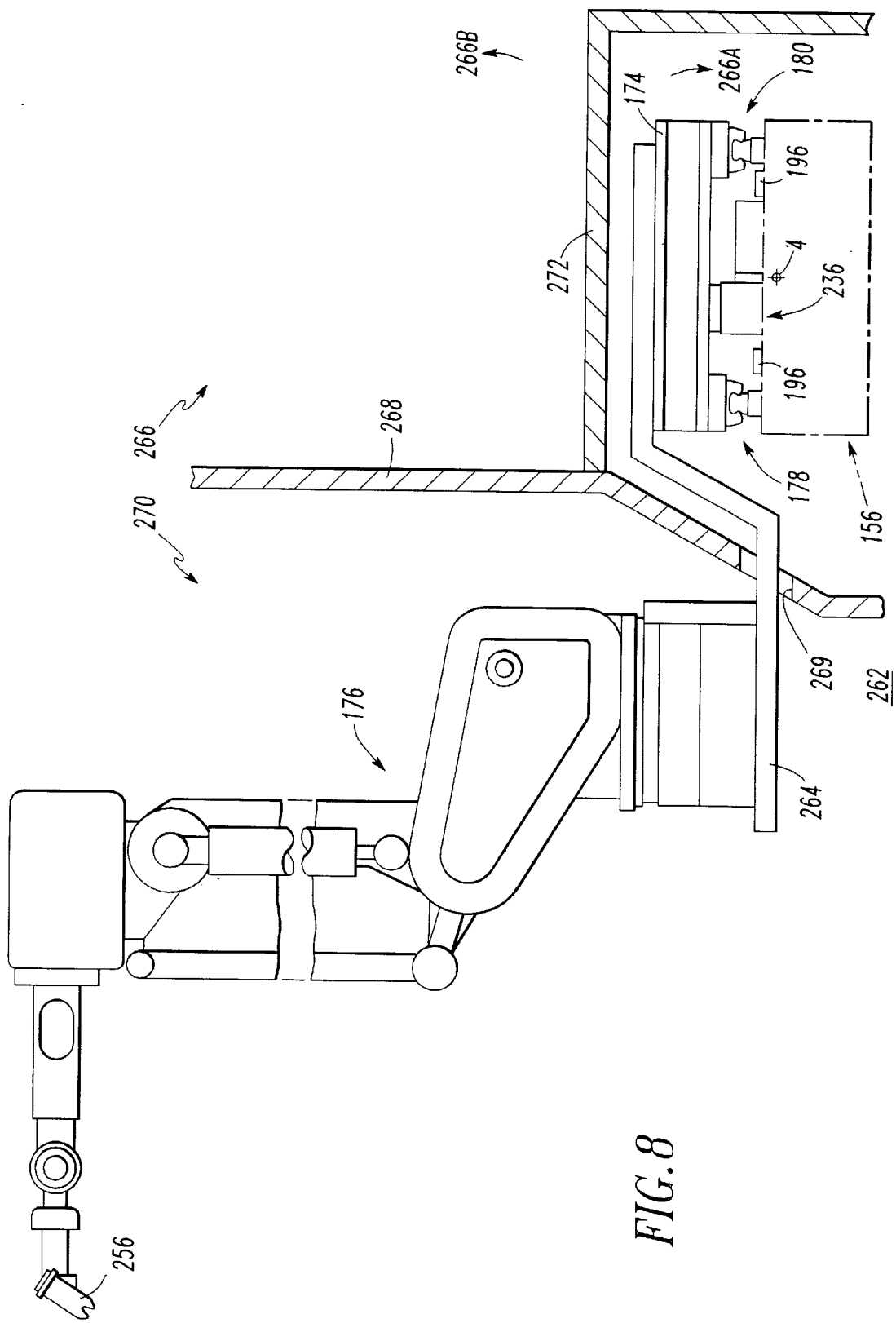
FIG. 8 is an elevation view of a Clean Wall robot and rail system in accordance with an alternative embodiment of the invention.

Referring to FIG. 8, a Clean Wall robot and rail system 262 is illustrated. The exemplary system 262 includes the reconfigurable rail system 156 (shown in phantom line drawing) and the robot 176 having the painting nozzle 256, although the system 262 is applicable to a wide variety of robotic applications. The robot 176 is operatively associated with the carriage 174 and a mounting assembly, such as a cantilevered adapter mechanism 264 cooperating with the carriage 174 for supporting the robot 176. The rail system 156 and the carriage 174 are located on one side 266 of a wall 268. The cantilevered adapter mechanism 264 passes through a hole 269 in the wall 268. The robot 176 and a portion of the cantilevered adapter mechanism 264 are located on the other side 270 of the wall 268 in order to provide a Clean Wall configuration of the systems 156,262. Preferably, a barrier 272 encloses the rail system 156 and the carriage 174 in an area 266A in order that there is no air flow between an external area 266B and the side 270 of the wall 268.

The exemplary combined modular rail/robot systems 254, 262 of FIGS. 7 and 8 provide the ability to move the spray applicator nozzle 256 in order that paint can be applied to exterior and interior surfaces of large workpieces or parts, such as car, truck or bus bodies, aircraft sections, etc. The systems 254,262 provide for modular construction of the rail system 156, alternate usage in either Clean Wall or In-Booth configurations, low cost, and compatibility with a spray painting environment.

The rail system 156 of FIGS. 5A–5B is transportable or installable in sections or, alternatively, as a complete assembly. The rail system 156 provides precise longitudinal and transverse alignment thereof with respect to the auxiliary axis 4 which is critical for various spraying applications such as painting. Using the modular construction allows for both In-Booth and Clean Wall configurations with most of the components being common between the configurations. Various reconfigurable lengths of the auxiliary axis 4 are easily constructed from the exemplary standard sections 160 and 162 (which has about twice the length of the section 160). Relatively long auxiliary axis 4 lengths (e.g., 21.0M or more) are provided and easily handled using the relatively short exemplary 1.5M and 3.0M module lengths. The various configurations are easily revised in the plant if necessary. Two or more robots 176 are operable on the same rail system 156. Most specific configurations are provided without additional engineering and design.

While specific embodiments of the invention have been described in detail, it will be appreciated by those skilled in the art that various modifications and alternatives to those details could be developed in light of the overall teachings of the disclosure. Accordingly, the particular arrangements disclosed are meant to be illustrative only and not limiting as to the scope of the invention which is to be given the full breadth of the appended claims and any and all equivalents thereof.

What is claimed is:

1. A method of forming a modular rail system for supporting a painting robot for in-booth or clean wall painting operations, comprising the steps of:

connecting a plurality of modular intermediate rail sections together to form a desired length of intermediate rail sections for a painting task, wherein the desired length of the intermediate rail sections is variable for different painting tasks by adding or removing intermediate rail sections;

connecting a first end rail section to one end of the length of intermediate rail sections;

connecting a second end rail section to the other end of the length of intermediate rail sections;

mounting at least one carriage assembly on the rail sections such that the at least one carriage assembly is movable along the rail sections; and removably mounting a painting robot to the at least one carriage assembly.

2. The method as claimed in claim 1, including placing the modular rail system on one side of a wall in a clean wall paint system;

connecting a cantilevered adapter mechanism to the at least one carriage, the cantilevered adapter mechanism configured to extend through the wall into a paint booth; and removably mounting the painting robot on the cantilevered adapter mechanism in the paint booth.

3. The method as claimed in claim 1, including placing the modular rail system inside a paint booth;

connecting a support mechanism to the at least one carriage;

removably mounting the painting robot to the support mechanism; and attaching a cover to the rail system.

4. The method as claimed in claim 1, including connecting one end of a modular cable carrier to the at least one carriage assembly to supply power to a drive assembly mounted on the carriage assembly.

5. The method as claimed in claim 1, wherein each rail system includes a pair of spaced-apart bearing ways and the method includes connecting a portion of the bearing ways from one rail section to an adjacent rail section to connect the plurality of intermediate rail sections.

6. The method as claimed in claim 1, including connecting a plurality of hollow support tubes together to form each of the rail sections.

7. The method as claimed in claim 1, including:

removing the painting robot from the at least one carriage assembly;

attaching an adaptor mechanism to the at least one carriage assembly; and mounting the painting robot on the adaptor mechanism to convert from an in-booth to a clean wall configuration.

8. The method as claimed in claim 1, including attaching at least one leveling mechanism to at least one of the rail sections to raise and lower the at least one rail section.

9. The method as claimed in claim 6, including:

positioning one of the hollow support tubes to form a forward wall;

positioning another of the hollow tubes to form a rearward wall;

mounting a first bearing way on the forward wall; and mounting a second bearing way on the rearward wall, wherein the at least one carriage assembly is movable along the bearing ways.

10. The method as claimed in claim 6, including attaching a pair of transverse members to the hollow support tubes.

11. The method as claimed in claim 6, wherein the tubes are generally rectangular and the method includes welding adjacent tubes together.

12. The method as claimed in claim 9, wherein a longitudinal channel is located between the forward wall and the rearward wall and the method includes mounting a longitudinal rack mechanism in the longitudinal channel.

13. The method as claimed in claim 9, including moving one of the first or second bearing ways with respect to the other of the first or second bearing ways to adjust a distance between the first and second bearing ways.

14. A method of forming a modular rail system for supporting a painting robot for in-booth or clean wall painting operations, comprising the steps of:

connecting a plurality of modular intermediate rail sections together to form a desired length of intermediate rail sections for a painting task, wherein the desired length of the intermediate rail sections is variable for different painting tasks by adding or removing intermediate rail sections;

connecting a first end rail section to one end of the length of intermediate rail sections;

connecting a second end rail section to the other end of the length of intermediate rail sections;

mounting at least one carriage assembly on the rail sections such that the at least one carriage assembly is movable along the rail sections;

removably mounting a painting robot to the at least one carriage assembly; and coupling different sized rail sections for different sized painting operations.

* * * * *